No. 617,205. Patented Jan. 3, 1899.
W. A. THRALL.
RAILWAY MILEAGE TICKET.
(Application filed Sept. 29, 1897.)

(No Model.) 3 Sheets—Sheet 1.

INVENTOR:
WILLIAM A. THRALL

No. 617,205. Patented Jan. 3, 1899.
W. A. THRALL.
RAILWAY MILEAGE TICKET.
(Application filed Sept. 29, 1897.)

(No Model.) 3 Sheets—Sheet 2.

No. 617,205. Patented Jan. 3, 1899.
W. A. THRALL.
RAILWAY MILEAGE TICKET.
(Application filed Sept. 29, 1897.)
(No Model.) 3 Sheets—Sheet 3.

WITNESSES:
Sew. E. Curtis
H. W. Munday

INVENTOR:
WILLIAM A. THRALL
BY Munday, Evarts & Adcock.
HIS ATTORNEYS

THE NORRIS PETERS CO., PHOTO-LITHO., WASHINGTON, D. C.

UNITED STATES PATENT OFFICE.

WILLIAM A. THRALL, OF CHICAGO, ILLINOIS.

RAILWAY MILEAGE-TICKET.

SPECIFICATION forming part of Letters Patent No. 617,205, dated January 3, 1899.

Application filed September 29, 1897. Serial No. 653,474. (No model.)

*To all whom it may concern:*

Be it known that I, WILLIAM A. THRALL, a citizen of the United States, residing in Chicago, in the county of Cook and State of Illinois, have invented a new and useful Improvement in Railway Mileage-Tickets, of which the following is a specification.

My invention relates to railroad mileage-tickets.

The object of my invention is to produce what may be termed an "interline railroad mileage-ticket," or one which is suitable for use upon any one or more of a large number of different railroad-lines, each of which shall receive compensation for the proportionate number of miles traveled upon its line for which the ticket is used.

Heretofore efficient and practicable railroad mileage-tickets have been produced which provide means for fulfilling all necessary conditions and requirements of such tickets when their use is confined to the single and particular line of railroad issuing the tickets—such, for example, as simplicity and cheapness of construction, lightness and compactness in form to enable them to be readily carried in the pocket of the passenger, means for conveniently estimating the mileage (both by the passenger and conductor) to be detached for each ride to prevent mistakes or disputes, means for quickly and conveniently making the mileage detachment for each trip or ride to enable the conductor to go through the train and make his fare collections in the very limited time in which this must always be done, means for enabling the mileage detachment for each ride to always be made in a single piece to enable the conductor to properly make his fare-collection reports and the auditing department of the railroad company to properly audit the same and guard against fraud and loss, means which enable the ticket to bear in permanent form, in plain view, and open to inspection at all times until the ticket is entirely used the special printed contract, which constitutes an essential portion of the ticket, and means for enabling the conductor to identify the passenger by his signature upon the mileage detachment made for each ride to comply with the special conditions of the printed contract. This will readily be understood by those skilled in the art by reference to the ticket shown and described in Letters Patent No. 342,941, granted to me June 1, 1886, or to other Letters Patent of the United States subsequently granted, showing and describing railroad mileage-tickets having the same general construction and embodying the same prerequisites; but heretofore no railroad mileage-ticket has been produced having means or provisions for fulfilling, in addition to the above-mentioned necessary conditions and requirements of a successful and practical railroad mileage-ticket, the other conditions and requirements which are necessary to enable the ticket to be used indiscriminately upon a number of different railroad-lines without danger of fraud upon or loss to the different individual roads in the system or great inconvenience and annoyance to the passenger holding the ticket and to the conductor, ticket agents, and other officers of the railroad company or companies composing the system upon whose lines the ticket is designed to be used interchangeably.

After much careful study and experimenting I have devised and constructed an interline or interchangeable railroad mileage-ticket which is of the necessary simple and cheap construction and which I think fulfils all the necessary conditions and requirements to enable the ticket to be used interchangeably upon any number of different railroad-lines without any danger of loss or fraud to any of the lines composing the bureau or association, and which will at the same time be of the very greatest convenience both to the passenger using the ticket and to the conductors and officials of the company.

My new mileage-ticket comprises, in combination, flexible folding covers, a continuous mileage-strip with agent's stub and mileage bureau check attached, and which is secured at one end only to one of the flexible front and rear folding covers inclosing the mileage-strip, a straight edge of metal or other suitable material secured to one of the flexible folding covers at its end to enable the mileage to be properly detached in a single strip for each trip or ride, the covers being provided with the special contract conditions and also with a number of trip-record slips or sheets on the inside of the cover, in which the holder of the ticket may be required to enter the station to and from which he travels and the initials of the railroad on which each detachment of mileage-strip is used for passage. The ticket is not signed by the purchaser; but the passenger or user of the ticket is required to sign his usual business signature and address upon a mileage identification-slip adapted to be pasted by the conductor upon each mileage detachment when he makes it. The identification-slip contains blank space for the signature and address to be written by the holder of the mileage-ticket and blanks or spaces for form and number of mileage-ticket, for stations from and to which and the train and date on which used, to be filled in by the conductor, and space for conductor's punch and consecutive number upon each end, one end being in the form of paster with perforations to separate it from the main body of the slip. By comparing the signatures on the identification-slips the auditor of the railroad or ticket mileage bureau issuing the ticket may easily ascertain whether the ticket has been used according to its conditions solely by the purchaser, while the identification-slips identify with each road the portion or portions of each mileage-ticket used upon it, so that each road can get full compensation for the number of miles traveled thereon, and the trip-record also affords further means for giving true and proper credit to each of the several roads upon which the tickets may be used.

In the accompanying drawings, forming a part of this specification, Figure 1 is a plan view of an interline or interchangeable railroad mileage-ticket embodying my invention, showing the face or outside view of the back cover of the ticket and a face view of the mileage identifying-slip used in connection with and forming a part of the ticket. Fig. 2 is an inside face view of the front cover of the ticket, showing the tearing-strip or straight edge attached thereto at its end and also the sheet or strip bearing the contract conditions upon which the ticket is sold and according to which it must be used. Fig. 3 is a detail view showing one of the trip-record sheets or slips which are attached to the front cover and form part of the ticket. Fig. 4 is an inside view of the front and back ticket-covers open, showing the ticket-holder's refund-certificate blank printed upon the inside of the front cover and a portion of the continuous mileage-coupon strip attached to the back cover. Fig. 5 is a plan view of the ticket, showing the outside or face view of the front cover and having printed thereon blanks for dating the ticket or the time for which it is good and the names of the different lines or railroad companies upon which the ticket may be used interchangeably.

In the drawings like letters of reference indicate like parts in the several figures.

Figures 6, 7, 8, 9:
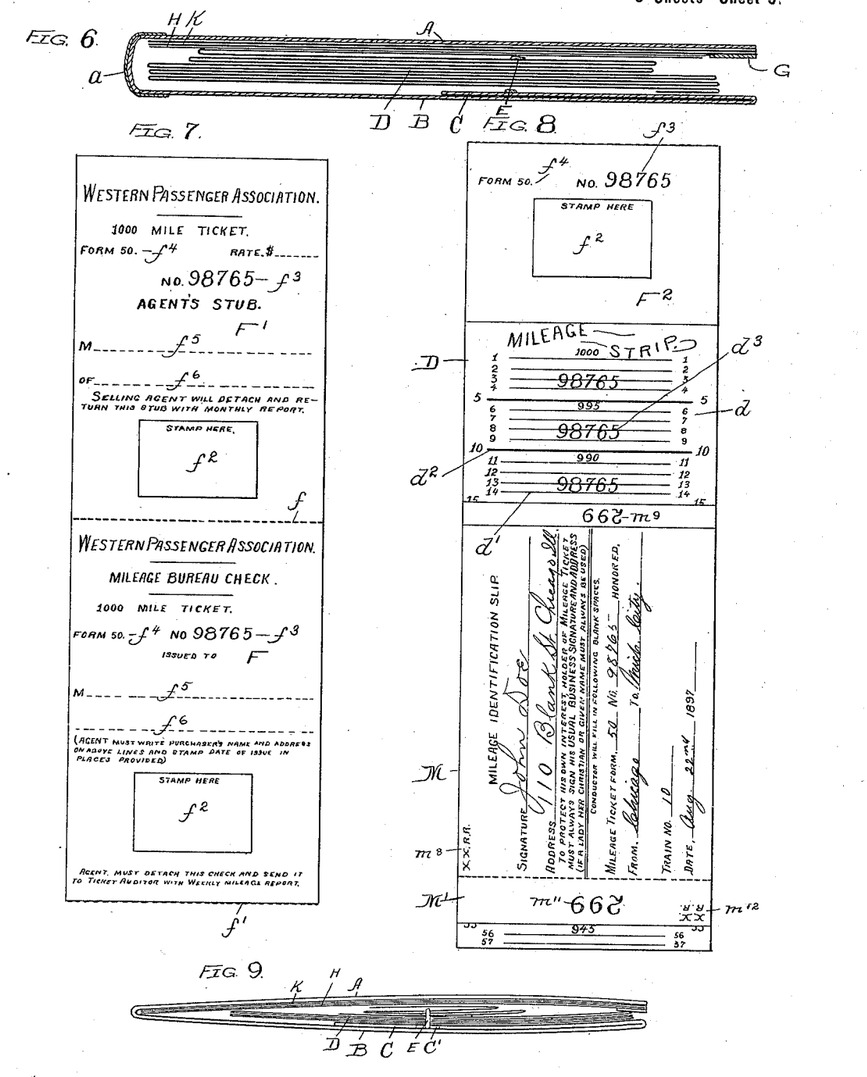
Fig. 6 is an enlarged detail longitudinal section of the ticket, the thickness of the ticket and the space occupied by the alternate folds of the continuous mileage-coupon strip being, however, greatly exaggerated in order to clearly illustrate the same in the drawings.
Fig. 7 is a detail plan or face view showing the agent's stub and the check attached to the free end of the continuous mileage-coupon strip before the ticket is sold and which is detached at the time it is sold.
Fig. 8 is a plan or face view of a detached portion of the continuous mileage-coupon strip, showing the mileage identification-slip pasted thereto, as required.
Fig. 9 is an edge view.

In the drawings, A represents the front, and B the back, of the flexible folding cover of the ticket, the front and back being preferably formed of a single piece of cardboard or pasteboard folded or creased at one end of the ticket and reinforced by a back or hinge strip $a$, of cloth or other suitable material. By making the flexible front and back of suitable paper-board the necessary conditions, instructions, and contract terms for use of the ticket and the names of the roads upon which it is to be used may be printed or written directly upon the inside and outside faces of the cover.

C is a paper-board flap preferably formed integral with the back B of the cover and pasted thereto on the inside thereof at its outer end portion and having its inner end portion free from the cover and provided with retaining-notches C' C' for holding in position the rubber band E, by which the alternately-folded continuous mileage-coupon strip D is retained properly in its folded form and within the flexibly-folding cover which bears the contract portion of the ticket, of which the mileage-coupon strip forms a part.

The mileage-coupon strip D bears the consecutively-numbered mileage-coupons $d$ from "1" to "1,000," "1" to "1,500," or "1" to "2,000," as may be required, and is secured or pasted at its last or rear end only to the back B of the cover, or rather to the flap or extension C, forming a part thereof, as will be readily understood from the drawings. The mileage-coupon strip has secured to its first or front end, preferably by pasting, although it may be formed integral therewith, a mileage bureau check or stub F and an agent's stub F', the two being preferably in a single strip of paper and separated from each other by a line of perforations $f$. The strip F F' also has a ticket-number or stamp-stub $F^2$ formed integral therewith and separated therefrom by a line of perforations $f'$. Each of the stubs F F' $F^2$ contains a blank or space $f^2$ for the agent's stamp, a blank or space $f^3$ for the number of the ticket, (the ticket illustrated in the drawings being numbered 98,765,) and a blank or space $f^4$ for the form-number of the ticket. The stubs F F' also contain blanks or spaces $f^5$ for the agent to fill in the name of the purchaser of the ticket-blanks $f^6$ for filling in his business or permanent address.

The continuous mileage-coupon strip D has its consecutively-numbered mileage-coupons $d$ separated from each other by printed lines $d'$ and heavy printed lines $d^2$ at every fifth mile, and the space between every fifth mile also has the ticket-number $d^3$ printed thereon corresponding to that upon the stubs F F' F² and to that upon the front and back A B of the flexible cover and other parts of the ticket.

G is a tearing-strip or straight edge of metal or other hard material, which is secured to the front A of the flexible cover of the ticket at the free end thereof, against which the continuous mileage-coupon strip D may be torn at any point desired on straight lines to make each mileage detachment for each ride according to the number of miles from the station where the passenger gets on to that where he gets off.

H is a slip or sheet, preferably of strong durable paper, attached to the front A of the flexible cover at the outer or free end thereof, upon which are printed the contract conditions or terms governing the use of the ticket and the payment of the rebate representing the reduced price at which the ticket is sold in case the conditions of the contract are fulfilled or observed by the purchaser. This contract slip or sheet H is preferably secured to the front A of the flexible cover by the tearing-strip or straight edge G, the tongues or rivets $g$ of which are inserted through it and the front A. The contract slip or sheet H has a blank or space $h$ for the number of the ticket, a blank or space $h'$ for the form-number of the ticket, blanks or spaces $h^2$ $h^3$ $h^4$ $h^5$ $h^6$ $h^7$ $h^8$ $h^9$ $h^{10}$ $h^{11}$ for the several terms or conditions governing the use of the ticket and the repayment of the rebate, the same being preferably as follows:

"1. If this ticket is wholly used by one and the same person in payment for his individual transportation, in accordance with the conditions hereon, and the signatures on the identification-slips show identity each with the other, and the trip-record properly filled up by the user and the cover properly signed and with the trip-record sent to the mileage-ticket bureau at Chicago within fifteen months from date of sale, a refund of ten dollars will be paid to the person so using it; otherwise no refund will be made.

"2. Whenever it is used for passage, an identification-slip (which will be furnished by the conductor) must be properly signed in presence of conductor on the train by the holder with his usual business signature and address. (If a lady, her Christian or given name must always be used.)

"3. The holder must record each trip (giving date, stations from and to, and initials of road) on the blanks provided herein for that purpose, which record must correspond with mileage detachments as made by conductors.

"4. If altered or mutilated in any manner it shall thereby become void and all rights thereto and all sums of money paid therefor shall be forfeited.

"5. No portion of the mileage-strip will be accepted for passage if detached from this cover, nor if the numbers on margin thereof representing miles do not run in continuous order from the lowest number at the top of the strip up to '1000,' nor if presented without the cover bearing same form and consecutive number.

"6. One coupon shall be detached for each mile or fraction of a mile traveled, except that for bridges taking arbitraries proper additional coupons therefor shall be detached, and that for distances less than five miles five coupons shall be detached.

"7. The holder is entitled to stop only at the regular stopping-places of the train upon which ticket is used.

"8. When this ticket shows baggage cancellation baggage will not be checked until that portion showing baggage cancellation has been used for passage.

"9. The baggage liability of any company is limited to wearing-apparel not exceeding one hundred dollars in value.

"10. This ticket is subject to local regulations of each line over which it may be honored for passage."

K K are the trip-record slips or sheets, the same being provided with a series of blanks $k$ $k$ for entering for each trip or ride the following data, viz: first, the date; second, the station from and, third, the station to which the passenger travels; fourth, the name or initials of the railroad on which the trip is made, and, fifth, a blank for other data—as, for example, the number of the first or last mileage-coupon of the detachment made. Each of the trip-record slips or sheets K, the same being preferably five or six in number so as to provide a sufficient number of trip-record blanks for use of any ticket, also has a blank or space $k'$ for the number of the ticket and a blank or space $k^2$ for the form-number of the ticket.

The outside face A' of the front A of the flexible cover has a blank or space $a'$ for the number of the ticket, a blank or space $a^2$ for the form-number of the ticket, a series of marginal blanks or spaces $a^3$, $a^4$, and $a^5$ for punching the date by year, month, and day of month at which the ticket is filed, the blanks or spaces $a^3$ being numbered consecutively from "1" to "31" for the day of the month, the blanks or spaces $a^4$ being twelve in number and having printed therein the abbreviations for the names of the months, and the blanks $a^5$ being preferably about six in number and having the year dates printed therein. The outside face A' of the front A of the cover also has a blank or space $a^6$ upon which may be printed or written the names or initials of the different railroad lines or companies upon which the ticket may be used and above which may preferably be printed the following: "Conditions or regulations in relation to the use of the ticket. Good only when officially stamped and presented with mileage-strip attached, subject to conditions named herein. Void for passage after date canceled in margin. Regulation amount of baggage allowed free. Good over the following-named lines," or other similar or suitable matter. Below the blank $a^6$ for the names of the railroad companies is a blank $a^7$ for the signature of the commissioner of the passenger association or mileage bureau or other officer having authority to issue the ticket.

The inside face $A^2$ of the front A of the flexible cover has a blank or space $a^8$ for the ticket-holder's certificate or statement that he has used the ticket in accordance with the conditions of the special contract, and that he is entitled to the rebate or refund expressed in the contract. This inside face also has a blank $a^9$ for the ticket-holder's signature, a blank $a^{10}$ for his address, a blank $a^{11}$ for the agent's signature as a witness, and a blank $a^{12}$ for the name of the railroad company, and a blank $a^{13}$ for the station to which the agent belongs, also a blank $a^{14}$ for the signature of the firm or business concern with which the ticket-holder is or may be connected and to whom the refund may be paid, if desired, and a blank for the address and date. It also has blanks $a^{15}$ $a^{16}$ for the number and form of the ticket.

The outside face B' of the back B of the flexible cover has a blank or space $b$ for the number of the ticket, a blank or space $b'$ for the form of the ticket, and a blank or space $b^2$ for a notice to the purchaser in relation to transmitting the ticket to the mileage-ticket bureau or other office for adjustment of his claim for rebate or refund, which may preferably read as follows:

"Notice to purchaser: The authorized agent of any line named herein may receive this cover and trip record, witness signature to certificate, and transmit the same to mileage-ticket bureau for attention in accordance with conditions of ticket. (See paragraph 1.)"

The outside face B' of the back B of the cover also has a blank or space $b^3$ for instructions to conductors in relation to the ticket, which may preferably read as follows:

"INSTRUCTIONS TO CONDUCTORS.

"Require signature and address of holder to be made in your presence on identification-slip, fill in all blank spaces as indicated, attach same to mileage-strip detached for passage, and turn in with collection.

"Study the instructions furnished you regarding mileage-tickets and the conditions on the inside of cover, and reckon the distances and make the detachments in accordance therewith.

"To avoid errors, be certain that the straight edge is adjusted at the proper place before making the detachment.

"Do not honor mileage-strips unless attached to cover bearing same consecutive number, or if the numbers, representing miles do not run in continuous order from the lowest number at top of strip up to '1000,' nor any portion of a strip, if already detached or altered.

"If ticket is mutilated or altered in any way, take it up and collect fare.

"This ticket expires on the date indicated by punch-marks in the margin of face.

"Conductor will allow holder to retain this cover unless taken up on account of mutilation or alteration."

The inside face $B^2$ of the back B of the flexible cover has a blank or space $b^4$ for the railroad-ticket-agent's stamp who sells the ticket.

M is the mileage identification-slip, one of which is to be pasted by the conductor on each mileage coupon detachment which he makes in collecting the fare. The mileage identification-slip has a blank or space $m$ for the signature of the passenger presenting the mileage-ticket, a blank $m'$ for his address, a blank or space $m^2$ for the form-number of the ticket and a blank or space $m^3$ for the number of the ticket, and a blank or space $m^4$ for the names of the stations from and to which the mileage-ticket is used, and a blank or space $m^5$ for the train number, a blank or space $m^6$ for the date, a blank or space $m^7$ for the conductor's punch-mark, a blank or space $m^8$ for the name of the railroad company, and a blank or space $m^9$ for the consecutive number of the mileage identification-slip. Each mileage identification-slip is also provided with an integral stub M', separated from the main portion of the slip by a line of perforations $m^{10}$ to enable the slip to be separated from the stub, the stub containing the blank or space $m^{11}$ for the number of the slip and a blank or space $m^{12}$ for the name or initials of the railroad company. These mileage or identification slips are furnished in suitable pads or packages of fifty, one hundred, or more slips in a pad to the conductors by each railroad or line upon which the interline or interchangeable mileage-tickets may be used, and when the conductor makes each mileage-coupon detachment he pastes one of these identification-slips bearing the name of his company upon each detachment and fills in the blanks which fully identify the form and number of the ticket from which the detachment was made. The slip also identifies by his signature the passenger using the ticket and also identifies the particular detachment with the road upon which it was used and the particular train, date, and conductor, the conductor's punch-mark serving the same as his signature.

The operation or method of use of my new mileage-ticket is as follows: It can be issued either by an individual railroad or by a mileage bureau or association for a number of railroads and furnished to ticket agents in such denomination of one thousand or fifteen hundred miles, &c., and at such rates of thirty dollars, forty dollars, &c., and carrying such refund of five dollars, ten dollars, &c., upon compliance with conditions, as may be desired. If tickets are issued and furnished and refund paid by the bureau or association, a bond could be required of each individual railroad selling the ticket through its agents for protection to insure each road against all the others and the association for proper settlement on sales of the ticket and of proportions earned on mileage detachments honored for passage.

The agent in selling the ticket simply writes in the purchaser's name and address upon the agent's and mileage bureau or auditor's stub, stamps the head of the mileage-strip in three spaces indicated and the space on the inside of the rear cover underneath the mileage-strip, limits the ticket by punching date of expiration in margin of front cover, and cautions the purchaser to carefully read the conditions and particularly that if he desires to obtain refund it will be necessary to use the ticket for his individual passage only, and especially to write his business signature and address in the same way upon the identification-slips furnished by the conductor and to correctly fill in the trip-record.

The identification-slips, consecutively numbered, are furnished in pads of suitable number by each individual railroad to its conductors. On presentation of a mileage-ticket for passage the conductor receives it for the purpose of making detachment of proper mileage from the strip, hands the holder of the ticket the pad of identification-slips with request to sign his usual business signature and address. On receiving back the pad the conductor writes the form and number of mileage-ticket, points between which he has made detachment, number of train and date, cancels the slip with his ticket-punch, and attaches the slip by means of paster end to the detachment made from the mileage-strip and sends it to the ticket-auditor with his other ticket collections.

The auditor of the railroad or of the mileage bureau, according to the plan used, has the identification-slips detached by means of the perforation from mileage detachments, and has them assorted according to mileage-tickets. Those bearing number of each mileage-ticket are then compared as to handwriting of user of ticket to determine whether the ticket has been used in accordance with the conditions providing for refund.

The identification-slip when detached from the mileage-strip will contain a complete history of the mileage detachment, as it will show the signature and address of the user, the form and number of mileage-ticket, the station from and to which used, the train and date on which used, and the conductor (by his punch-mark) who honored it; also the number of the identification-slip will remain pasted on the mileage detachment for future reference in cases of necessity. The identification-slips will then be used for the purpose of checking up mileage-ticket covers and trip-records to determine whether the ticket has been used in accordance with the conditions providing for refund.

The mileage detachments honored by each road are billed monthly or oftener against the issuing road or mileage bureau and settlement made on the face of the detachments therefor. In addition when the mileage-cover is sent in for refund the issuing road or bureau checks the identification-slips against the trip-record, adjusts any discrepancies, and if any slips are missing the proportion thereon is reported to the road named on the trip-record as having carried the passenger upon the same principle as now obtains in reporting proportions to connecting lines on interline coupon-tickets, regardless of collection of missing coupons.

In this way are completed the several operations of issuing the ticket, selling it, accepting it for passage, paying refund, if any is due, and settling with each railroad for any hauls on the ticket, as shown by the mileage detachments taken up and the trip-record.

The advantages of my improved ticket will be readily understood and appreciated by those skilled in the art from the foregoing description. It is equally well adapted for use either as a ticket good upon a single road or as an interline or interchangeable ticket good upon a great number of different roads, and when used either as a single or an interline ticket it fulfils all the necessary conditions or requirements of a successful and practical mileage-ticket. It, moreover, affords very full and complete protection to the railroad companies against loss, fraud, or mistake.

The trip-record, the accurate keeping of which is made a condition of the refund, gives necessary data to check detachments and also for accounting to the proper railroad for any missing detachments. The absence heretofore of the means of reliably obtaining such information has been a great objection and obstacle to the adoption of an interchangeable mileage-ticket good over a number of different railroad systems. Experience of railroad accounting shows a considerable percentage of missing mileage detachments, on which no accounting could be made without this new device of the trip-record.

The identification-slip to be signed with business signature and address of holder of ticket in presence of conductor and while the conductor has the mileage-ticket for the purpose of making detachments insures the best possible record of handwriting for comparison in paying refund and with the least possible opportunity to copy signature. The holder of this mileage-ticket cannot obtain his refund without keeping a proper trip-record of the use of the ticket, which is of great value to the railroads, nor without writing his signature and address in the same manner upon the identification-slips. At present or heretofore the writing of the signature upon the back of the mileage detachments together with the signature of the holder to the contract conduces to fraud by enabling the holder of the ticket other than the original purchaser to copy a signature or to have the strip signed in advance of presentation and which are both liable to be overlooked by hurried or negligent conductors and when not overlooked give rise to controversy and trouble with holders of mileage-tickets.

In addition the filing of bond with the bureau, the issue of tickets by the bureau, and the report of sales to the bureau, together with payment of refund only by the bureau, afford effective safeguards if it is desired to make the mileage-ticket joint, so as to be honored in common by a number of different railroads operating the bureau for the purpose. It is very convenient for passengers. The ticket representing a given amount of transportation may safely be made good over any number of railroads occupying common territory and willing to join for the purpose, and is particularly well adapted to the requirements of commercial travelers and others traveling one thousand miles and upward over various railroads. Mercantile firms especially are desirous of having such a ticket good over a number of railroads in preference to present individual tickets good over the lines of one company or system only, and they much prefer to furnish the transportation in this form to their representatives to furnishing the cash to pay fares even upon a credit permit system affording same reduction.

For agents and conductors the ticket is convenient on account of its simplicity and dispensing with any punched description of purchaser and the necessity for requiring signature to contract or comparing description and contract-signature with those of persons presenting the ticket for passage. It is very much more convenient for the user than those forms of mileage-tickets requiring exchange for tickets at the ticket-offices previous to taking the train and which is deemed necessary to insure credit for the road's haul, which credit is secured in this ticket by means of the trip-record device. The trip-record will also commend itself for general accounting purposes of users of tickets as well as of the railroads.

The identification-slips which can be detached from the mileage detachments and sorted separately will prove a great facilitation in arranging, comparing, and filing data to govern refund as well as enabling the road honoring the mileage detachment to retain and handle them separately, and thus make and render bills thereon at their convenience or at such periods as may be designated.

The ticket trip-record and slip are very simple, so as to be readily comprehended and properly used by purchasers of the tickets and by agents and conductors. The contract provisions are brief but explicit.

The ticket is inexpensive, as the cost of the identification-slip is insignificant. No expensive blanks of any kind are necessary, such as required by many plans for interchangeable mileage or credit permits.

Conductors are relieved from any trouble with holders of tickets, such as is now constantly occurring in comparing signatures and punched description on present tickets with the holders and in refusing and frequently taking up tickets on account of difference in description, in signature, failure to identify, &c.

This ticket is promptly accepted by the conductor from any person presenting it without question if not expired or altered, and the company is thereby relieved from any risk which might otherwise be incurred on account of refusal of ticket or of taking it up on account of difference. Even if signature on identification-slip is refused the conductor accepts the ticket, but makes notation on the slip "Signature refused."

I claim—

1. The railroad mileage-ticket, comprising in combination flexible folding covers, a straight edge or tearing-strip secured to one of said covers at its end, and an alternately-folded, consecutively-numbered continuous mileage-coupon strip attached at one end only to the cover, and trip-record slip or sheet secured to and within the covers, and a mileage identification-slip having blanks or spaces for the number of the ticket and for the signature of the passenger, and provided with a gummed end adapted to be pasted upon each mileage-coupon detachment as the same is made by the conductor, whereby a proper record of the use of the ticket may be kept and required to be presented with the cover in order to secure payment of refund, and also furnishing necessary data for proper accounting, the gummed end and the remaining part of said identification-slip bearing the same number or identifying-mark substantially as specified.

2. The railroad mileage-ticket, comprising in combination flexible folding covers, a straight edge or tearing-strip secured to one of said covers at its end, and alternately-folded, consecutively-numbered continuous mileage-coupon strip attached at one end only to the cover, and trip-record slip or sheet secured to and within the covers, and a rubber band for holding the alternately-folded mileage-coupon strip in place between the covers, whereby a proper record of the use of the ticket may be kept and required to be presented with the cover in order to secure payment of refund, and also furnishing necessary data for proper accounting, and a mileage identification-strip having a gummed end and provided with spaces with designations descriptive of the ticket and a blank or space for the signature of the passenger, and bearing the same identifying number or mark both on the gummed part and the remaining part of said slip substantially as specified.

3. The mileage identification-slip for use in connection with railroad mileage-tickets, having a main portion bearing matter descriptive of the ticket, and a detachable gummed end for pasting it to each mileage detachment when the same is made, the main and detachable gummed portions of said slip bearing similar identification marks or numbers and provided with a blank or space for the signature of the passenger, in combination with a mileage-coupon ticket having flexible folding covers, a straight edge or tearing-strip on one of the covers, and an alternately-folded, consecutively-numbered continuous mileage-coupon strip attached at one end only to the cover substantially as specified.

4. The mileage identification-slip for use in connection with railroad mileage-tickets, having a gummed end for pasting it to each mileage detachment when the same is made, and provided with a blank or space for the signature of the passenger, and blanks or spaces for the form and number of the ticket and for the stations to and from which the passenger travels, the gummed end and the remaining part of said identification-slip bearing the same number or identifying-mark substantially as specified.

5. The mileage identification-slip for use in connection with railroad mileage-tickets, having a gummed end for pasting it to each mileage detachment when the same is made, and provided with a blank or space for the signature of the passenger, blanks or spaces for the form and number of the ticket and for the stations to and from which the passenger travels and for the train-number and date for the conductor's punch-mark, the gummed end and the remaining part of said identification-slip bearing the same number or identifying-mark substantially as specified.

6. The mileage identification-slip for use in connection with railroad mileage-tickets, having a main portion bearing matter descriptive of the ticket, and a detachable gummed end for pasting it to each mileage detachment when the same is made, and provided with a blank or space for the signature of the passenger, said slip having a line of perforations separating its gummed part from its main or body part and bearing the same slip-number on each part, in combination with a mileage-coupon ticket having flexible folding covers, a straight edge or tearing-strip on one of the covers, and an alternately-folded consecutively-numbered continuous mileage-coupon strip attached at one end only to the cover substantially as specified.

7. The mileage identification-slip for use in connection with railroad mileage-tickets, having a gummed end for pasting it to each mileage detachment when the same is made, and provided with a blank or space for the signature of the passenger, and blanks or spaces for the form and number of the ticket and for the stations to and from which the passenger travels, said slip having a line of perforations separating its gummed part from its main or body part and bearing the same slip-number on each part, substantially as specified.

8. The mileage identification-slip for use in connection with railroad mileage-tickets, having a gummed end for pasting it to each mileage detachment when the same is made, and provided with a blank or space for the signature of the passenger, blanks or spaces for the form and number of the ticket and for the stations to and from which the passenger travels and for the train-number and date for the conductor's punch-mark, said slip having a line of perforations separating its gummed part from its main or body part and bearing the same slip-number on each part, substantially as specified.

9. The combination of a railroad mileage-ticket with a trip-record slip or sheet secured thereto and an identification-slip having a gummed end for attachment to each mileage detachment, and having a blank for the signature of the passenger, the gummed and remaining part of said identification-slip bearing the same identifying number or mark, substantially as specified.

10. The combination with a railroad mileage-ticket having flexible covers, a tearing-strip attached to one of the covers, a continuous, consecutively-numbered alternately-folded mileage-coupon strip attached at one end only to the cover, and a flexible band embracing the alternately-folded mileage-coupon strip, of an identification-slip having a blank portion for the signature of the passenger and a gummed end or portion for attachment to the mileage-coupon strip as detached, said identification-slip bearing the same identifying number or mark both on its gummed portion and on its remaining portion, substantially as specified.

11. The combination of a railroad mileage-ticket with a trip-record slip or sheet secured thereto and provided with blanks for entering a record of each of the several successive different trips for which the ticket is used and detachments of mileage-coupons made, each of said blanks having a space for entering the date, the stations from and to which and the name or initials of the railroad on which the trip is made, and an identification-slip having a gummed end for attachment to each mileage detachment, and having a blank for the signature of the passenger, the gummed and remaining part of said identification-slip bearing the same identifying number or mark, substantially as specified.

12. The ticket identification-slip comprising a main portion having matter descriptive of the ticket and a detachable gummed portion, the main and detachable portions having similar identification marks or numbers, substantially as specified.

WILLIAM A. THRALL.

Witnesses:
S. E. CURTIS,
H. M. MUNDAY.